United States Patent
Nguyen et al.

(10) Patent No.: US 9,214,679 B2
(45) Date of Patent: Dec. 15, 2015

(54) COATING PROCESS FOR PRODUCTION OF FUEL CELL COMPONENTS

(75) Inventors: Dien Nguyen, San Jose, CA (US); Tad Armstrong, Burlingame, CA (US); Emad El Batawi, Sunnyvale, CA (US); Avinash Verma, Cupertino, CA (US); Ravi Oswal, Fremont, CA (US); K. R. Sridhar, Los Gatos, CA (US); Ujwal Deshpande, Fremont, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 1081 days.

(21) Appl. No.: 12/591,464

(22) Filed: Nov. 20, 2009

(65) Prior Publication Data

US 2010/0129693 A1 May 27, 2010

Related U.S. Application Data

(60) Provisional application No. 61/193,377, filed on Nov. 21, 2008.

(51) Int. Cl.
| | |
|---|---|
| *H01M 8/10* | (2006.01) |
| *C23C 14/34* | (2006.01) |
| *H01M 4/88* | (2006.01) |
| *H01M 4/86* | (2006.01) |
| *H01M 4/90* | (2006.01) |
| *H01M 8/12* | (2006.01) |

(52) U.S. Cl.
CPC .......... *H01M 4/8871* (2013.01); *H01M 4/8621* (2013.01); *H01M 4/8867* (2013.01); *H01M 4/9016* (2013.01); *H01M 2008/1293* (2013.01); *Y02E 60/50* (2013.01); *Y02E 60/525* (2013.01)

(58) Field of Classification Search
None
See application file for complete search history.

(56) References Cited

U.S. PATENT DOCUMENTS

| | | | | |
|---|---|---|---|---|
| 5,882,809 | A * | 3/1999 | McPheeters et al. | 429/456 |
| 6,171,721 | B1 * | 1/2001 | Narayanan et al. | 429/432 |
| 6,772,501 | B2 * | 8/2004 | Armstrong et al. | 29/592.1 |
| 6,949,450 | B2 * | 9/2005 | Chiang et al. | 438/475 |
| 7,190,568 | B2 * | 3/2007 | Wood et al. | 361/320 |
| 7,326,484 | B2 | 2/2008 | Shibata et al. | |
| 7,422,819 | B2 * | 9/2008 | Reisdorf et al. | 429/456 |
| 7,566,513 | B2 | 7/2009 | Katagiri et al. | |
| 7,879,474 | B2 * | 2/2011 | Hilliard | 429/479 |
| 8,298,724 | B2 * | 10/2012 | Uchiyama et al. | 429/518 |
| 2002/0098404 | A1 * | 7/2002 | Shibata et al. | 429/40 |

(Continued)

OTHER PUBLICATIONS

International Preliminary Report on Patentability issued in PCT Application PCT/US2009/065095, mailed on Jun. 3, 2011.
International Search Report and Written Opinion, Intl. Application PCT/US2009/065095. International Search Authority—Korean Intellectual Property Office (ISA/KR), Jul. 1, 2010.

*Primary Examiner* — Patrick Ryan
*Assistant Examiner* — Christopher Domone
(74) *Attorney, Agent, or Firm* — The Marbury Law Group PLLC

(57) ABSTRACT

A method of making a solid oxide fuel cell (SOFC) includes providing a solid oxide electrolyte and depositing at least one electrode on the electrolyte by PVD, such as sputtering. A method of making an interconnect for a fuel cell stack includes providing an electrically conductive interconnect, and depositing a layer on the interconnect by PVD, such as depositing a LSM barrier layer by sputtering. The SOFC and the interconnect may be located in the same fuel cell stack.

14 Claims, 1 Drawing Sheet

(56) References Cited

U.S. PATENT DOCUMENTS

| | | | |
|---|---|---|---|
| 2003/0022051 A1* | 1/2003 | Haluzak | 429/34 |
| 2003/0138685 A1 | 7/2003 | Jankowski et al. | |
| 2003/0170544 A1 | 9/2003 | Jacobson et al. | |
| 2004/0076868 A1* | 4/2004 | Mardilovich et al. | 429/34 |
| 2005/0092597 A1* | 5/2005 | O'Neil et al. | 204/192.15 |
| 2005/0238796 A1 | 10/2005 | Armstrong et al. | |
| 2007/0166604 A1* | 7/2007 | Katagiri et al. | 429/45 |
| 2007/0209758 A1* | 9/2007 | Sompalli et al. | 156/330.9 |
| 2008/0047826 A1* | 2/2008 | Lin et al. | 204/192.12 |
| 2008/0311463 A1* | 12/2008 | Park et al. | 429/41 |

OTHER PUBLICATIONS

2nd Office Action, Chinese Application No. 200980145976.5, issued Jan. 8, 2014.

Search Report received in connection with Taiwan application No. 098139664; dated Mar. 11, 2014.

Office Action received in connection with Taiwan application No. 098139664; issued Mar. 13, 2014.

English Translation of the Office Action received in connection with Taiwan application No. 098139664; issued Mar. 13, 2014.

* cited by examiner

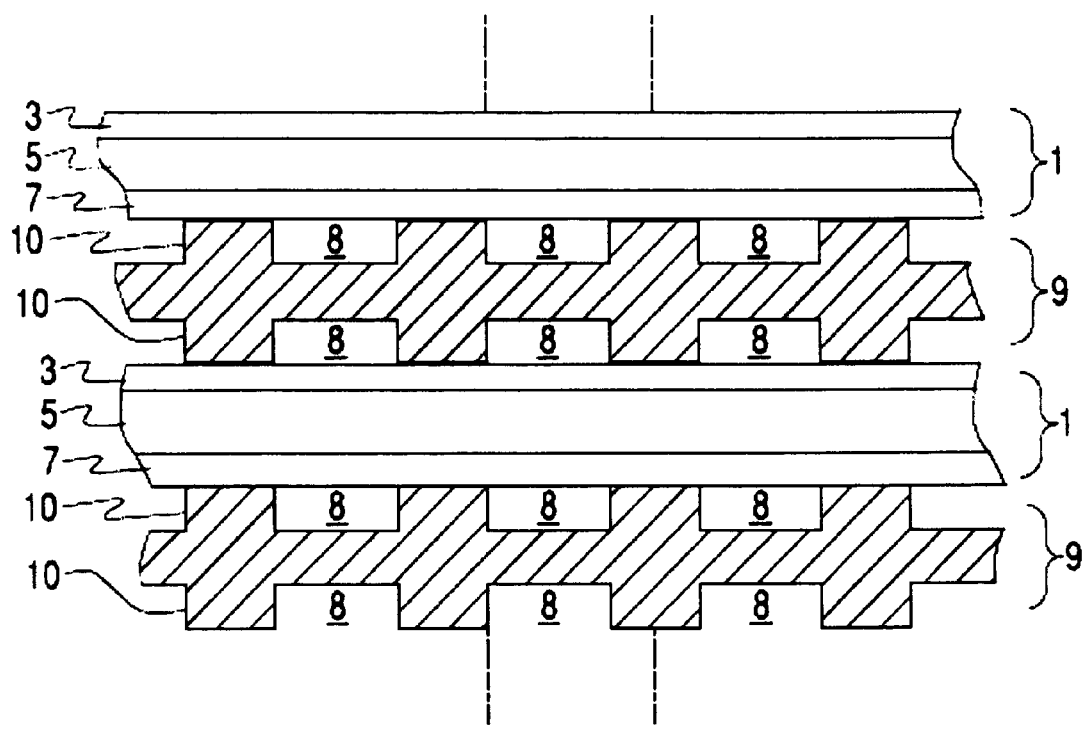

COATING PROCESS FOR PRODUCTION OF FUEL CELL COMPONENTS

CROSS REFERENCE TO RELATED PATENT APPLICATIONS

The present application claims benefit of U.S. provisional application 61/193,377, filed Nov. 21, 2008, which is incorporated herein by reference in its entirety.

BACKGROUND OF THE INVENTION

The present invention is generally directed to fuel cell components, and to solid oxide fuel cell materials in particular.

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell, while a fuel flow is passed through the anode side of the fuel cell. The oxidizing flow is typically air, while the fuel flow can be a hydrocarbon fuel, such as methane, natural gas, propane, ethanol, or methanol. The fuel cell, operating at a typical temperature between 750° C. and 950° C., enables combination of the oxygen and free hydrogen, leaving surplus electrons behind. The excess electrons are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Typically, SOFC are fabricated either as electrolyte supported, anode supported, or cathode supported, depending on which of the three functional components of the cell provides structural support. In planar electrolyte supported SOFC designs, the anode and cathode electrodes are painted as an ink onto the opposite surfaces of a planar ceramic electrolyte using a contact method such as screen printing. The interconnects or gas separator plates which are located between adjacent fuel cells contain an oxidation protection barrier layer, such as a lanthanum strontium manganite (LSM) layer on the side which faces the cathode (i.e., air) electrode of the fuel cell. The LSM layer may be deposited by a spray process, such as an air plasma thermal spray process.

SUMMARY

A method of making a solid oxide fuel cell (SOFC) includes providing a solid oxide electrolyte and depositing at least one electrode on the electrolyte by PVD, such as sputtering. A method of making an interconnect for a fuel cell stack includes providing an electrically conductive interconnect, and depositing a layer on the interconnect by PVD, such as depositing a LSM barrier layer by sputtering. The SOFC and the interconnect may be located in the same fuel cell stack.

BRIEF DESCRIPTION OF THE DRAWING

FIG. 1 is a side view of a fuel cell stack according to an embodiment of the invention.

DETAILED DESCRIPTION OF THE EMBODIMENTS

The inventors realized that the air plasma thermal spray process used to deposit the oxidation protection barrier layer on the interconnect is relatively expensive because of relatively low deposition efficiency and high source material wastage. Likewise, since the SOFC electrode screen printing method is a contact deposition method which includes handling the electrolyte, it requires a relatively thick electrolyte substrate (>150 microns) to have sufficient bulk strength.

The present inventors realized that a physical vapor deposition (PVD) method, such as sputtering, may be used to deposit layers on the interconnect and/or on the SOFC electrolyte. This will reduce the cost for depositing interconnect coatings and/or SOFC electrodes, and allows the use of thinner SOFC electrolytes, such as 50 to 125 micron thick electrolytes, for example 75 to 100 micron thick electrolytes and 1 to 5 micron thick electrodes. The thinner electrolytes decrease SOFC cost and improve cell performance.

Any suitable layers may be formed by PVD, such as sputtering or other PVD methods. For example, the oxidation barrier layer, such as an LSM layer, may be deposited by sputtering on side of the interconnect adapted to face the SOFC cathode. Likewise, one or both electrodes of the SOFC may be deposited on the electrolyte by sputtering. For example, a perovskite cathode electrode, such as an LSM, or lanthanum strontium chromite or cobaltite electrode may be sputtered on the electrolyte. Likewise, the anode electrode, such as a nickel-stabilized zirconia, a nickel-doped ceria, or a nickel-stabilized zirconia-doped ceria cermet electrode may be sputtered on the electrolyte. Non-limiting examples of the anode electrode cermets include a nickel-scandia or yttria stabilized zirconia cermet, nickel-samaria or gadolinia doped ceria cermet or a nickel-scandia or yttria stabilized zirconia-samaria or gadolinia doped ceria cermet. The nickel in the anode may be initially deposited as a nickel oxide and then reduced to nickel by an anneal in a reducing ambient, such as a hydrogen containing ambient. In one non-limiting embodiment, all layers coating the interconnect and both SOFC electrodes are formed by sputtering. In another embodiment, only some layers or electrodes, such as one layer or electrode, for example a LSM interconnect oxidation barrier and/or LSM SOFC cathode electrode are formed by sputtering.

The layers may be formed by passive and/or reactive sputtering. For example, LSM layers or electrodes may be formed by passive sputtering an LSM layer or electrode from a single LSM target. Alternatively, plural targets containing LSM component materials may be used. For example, metal targets (such as La, Sr and Mn targets and/or alloy or composite targets, such as Sr—Mn alloy or composite targets), single-phase oxide targets (such as $La_2O_3$, SrO or $MnO_2$), targets comprising a mixed blend oxides (such as $La_2O_3$, SrO and/or $MnO_2$) sintered to form a monolith, or a targets comprising a mixture of both metal and oxide may be used. Alternatively, reactive sputtering may be used to deposit the LSM layer or electrode. The reactive sputtering may be conducted in an oxygen ambient using a lanthanum-strontium-manganese composite or alloy target. The oxygen ambient may be provided to the sputtering chamber from an oxygen tank or another similar source. Instead of the lanthanum-strontium-manganese composite or alloy target, separate lanthanum, strontium and manganese targets and/or binary composite or alloy targets (such as Sr and Mn composite or alloy targets) may be used for reactive sputtering. The selection of the desired target allows the tailoring of the composition of the layer deposited by PVD (such as an electrode or protective layer). It should be noted that the composition of the deposited layer may not necessarily be the same as that of the target due to preferential sputtering of the elements in question. For anode electrode sputtering, either a single cermet target (such as a nickel-stabilized zirconia or doped ceria cermet target) or plural targets (such as a nickel or another metal target and a ceramic target, such as a stabilized zirconia or doped ceria ceramic target) may be used. A nickel oxide target may also be used to deposit an anode electrode comprising nickel oxide and a ceramic, such as a stabilized zirconia and/or a doped ceria. The nickel oxide may be later reduced to nickel with a reducing anneal. Reactive sputtering from metal targets may also be used to form the anode electrodes. Any suitable sputtering deposition systems may be used, such as rf, DC, magnetron (rf or DC type), ion beam or other sputtering systems in which a plasma or an ion beam is used sputter material from a target onto a substrate, such as the interconnect or SOFC electrolyte substrate, may be used. The sputtering process (passive or reactive) may be either static or dynamic. In a static process, a stationary substrate is coated by sputtering (i.e., a "stop-coat-go" type process). In a dynamic process, a moving substrate is coated by sputtering (i.e., a process with continuously moving parts).

In the case of forming the interconnect barrier coating, the material usage or target deposition efficiency would improve, leading to a higher deposition efficiency and lower manufacturing cost compared to thermal spray methods. It is expected that the deposition efficiency by the sputtering method would be much higher than about 50% efficiency achieved with air plasma thermal spray coating method. Furthermore, sputtering can produce a higher density coating for LSM on the interconnect. This allows a thinner barrier coating which results in lower cost and reduced ASR contribution.

In case of forming a SOFC electrode, PVD allows electrode thickness to be orders of magnitude lower than screen printing. For example, PVD, such as sputtering, allows formation of electrodes which have a thickness of less than ten microns, such as 100 nm to 5 microns, for example 1-2 microns, compared to electrodes formed by screen printing which are tens of microns thick. This allows formation of thinner cells with lower cost (i.e., due to less material used) and improved performance. Thinner cells with less bulk resistance generally are expected to provide a higher performance and lower degradation.

Furthermore, a contact deposition method, such as screen printing, would require a relatively thicker electrolyte substrate with a higher bulk strength, such as a thickness of 150 microns or more. The thick electrode made by screen printing is problematic when the electrolyte is made thinner. For example, cells with electrolyte thickness of less than 150 microns and thick screen printed electrodes experience process-induced camber when they undergo electrode sintering. Non-contact PVD method forms thinner electrodes and thus allows the use of thinner substrates (less than 150 microns), because electrodes having 1-2 micron thickness should lessen the camber effect.

With thinner electrodes, sintering, if at all needed, may also be improved. For thinner electrodes, it is possible to achieve co-sintering of both anode and cathode electrodes in the same firing cycle which will further reduce production cost. It is also possible to sinter the electrodes in the same continuous production line, together with depositions.

There are other advantages for forming layers and electrodes, such as LSM layers and electrodes by sputtering. Sputtering is cleaner process and is less prone to defects and breakage later in stack assembly process due to protrusions. There is no need for external roughening of surface of the substrate, such as the interconnect surface, which decreases process cost. Furthermore, the substrate, such as the interconnect surface may be treated by in-situ degassing or cleaning with sputter etching. In other words, the sputtering apparatus is first operated in a sputter etching mode (where the ions bombard the substrate rather than target surface to sputter etch the substrate surface) to clean the substrate surface before depositing the layer, such as an LSM layer, on the cleaned substrate surface. Post-annealing or other treatment substrate may be added.

Finally, sputtering allows deposition of a layer at different temperatures, or even having multiple layers coated using different conditions, including temperatures, enabling different grain structures, film stress control, etc. Thus, plural layers with different grain structures may be deposited on the same substrate (i.e., LSM layer with a smaller grain size may be deposited before or after (i.e., under or over) an LSM layer with a larger grain size). Alternatively, an amorphous LSM layer may be deposited before or after a polycrystalline LSM layer. Sputtering systems provide an ability to crystallize a layer or electrode in-situ, such as by heating the deposited layer during or right after deposition. For example, an amorphous coating of LSM applied to the interconnect or as the cathode electrode may be crystallized in-situ to provide a better electrical bond and possibly eliminate need for a cathode contact layer. In another embodiment, both sides of the fuel cell (e.g., both sides of the electrolyte) can be coated simultaneously. For example, the anode and cathode electrodes may be formed on opposite sides of the electrolyte at the same time by positioning the electrolyte between anode material and cathode material sputtering targets. Likewise, both major sides of the interconnect plate may be coated at the same time by respective barrier and/or contact layers. This would increase throughput and helps relieve stresses on the substrate, such as the electrolyte. The substrate, such as the electrolyte or interconnect may be positioned vertically (i.e., with an edge pointing up and down) on a substrate holder such that both major sides face a different sputtering target (or a different set of targets). The substrate may also be positioned horizontally if desired if one target is located above and the other target is located below the substrate. A partition may be provided around the substrate holder to prevent cross contamination from a given target to the opposite side of the substrate.

If reactive sputtering is used, then the reactive sputtering stoichiometry can be adjusted, such that an LSM layer with a higher oxygen content may be deposited before or after (i.e., under or over) an LSM layer with a lower oxygen content on the same substrate. While LSM is described as an exemplary perovskite, other conductive perovskites having a general formula $(La_xSr_{1-x})(Mn_yA_{1-y})O_3$ where A is Cr and/or Co, $0.6<x<0.9$, $0 \leq y<0.4$ or $(La_xD_{1-x})(E_yG_{1-y})O_3$ where D is Sr or Ca, and E and G are one or more of Fe, Co, Mn, and Cr ($0.6<x<0.9$, $0 \leq y<0.4$), including LSCr, LSCo, etc., or noble metals, such as Pt, may also be used.

In another embodiment, a PVD method, such as sputtering, is used to co-deposit multiple functional layers in the same processing run to form a multi-layer coating on an interconnect and/or a multi-layer electrode for a SOFC. This provides an ability to tailor any desired number of layers and tailor the composition to optimize redox tolerance, internal reformation and electrochemical three phase boundary with custom tailored morphology and thickness for each layer. Different types of layers (i.e., different composition, crystallinity stress state, etc.) with different functionality may be provided on each surface to decrease electrical contact resistance and potentially overall ASR.

For example, a first high temperature oxidation resistant metal alloy layer may be deposited over the interconnect surface. A second LSM layer is then deposited over the metal alloy layer. The metal alloy layer may be any suitable high temperature alloy layer, such as a nickel alloy layer which decreases oxide growth on the interconnect. The LSM layer is used as the cathode contact layer and would prevent or decrease Cr evaporation from a Cr alloy interconnect and hence would prevent or decrease cathode poisoning by Cr. If the cathode comprises a perovskite material other than LSM, such as a LSCr, then the contact layer may comprise the same other perovskite layer, such as LSCr. For example, the metal layer may comprise a 0.5 to 5 micron, such as 1-2 micron thick Haynes 230 alloy layer. The second layer may be a 0.5 to 5 micron, such as 1-2 micron LSM layer. The Haynes layer would decrease oxide growth and the LSM would prevent or decrease cathode poisoning. Haynes 230 is an alloy of nickel-chromium and tungsten having the following composition in weigh percent:

| | |
|---|---|
| Aluminum | 0.2-0.5 |
| Boron | 0.015 max |
| Carbon | 0.05-0.15 |
| Chromium | 20-24 |
| Cobalt | 5 max |
| Iron | 3 max |
| Lanthanum | 0.005-0.05 |
| Manganese | 0.3-1 |
| Molybdenum | 1-3 |
| Nickel | Balance |
| Phosphorus | 0.03 max |
| Silicon | 0.25-0.75 |
| Sulfur | 0.015 max |
| Tungsten | 13-15 |

In another embodiment, PVD targets, such as sputtering targets can be provided for specific composition, density, and/or with sacrificial fillers such as carbon and other organics that can be oxidized or burn off for porosity formation. Alternatively, sequential deposition can be optimized to lay down in 3-D preferential structure that can "build" the preferred porosity and pore morphology. U.S. application Ser. No. 12/292,151, filed on Nov. 12, 2008 titled Electrolyte Supported Cell Designed For Longer Life And Higher Power, incorporated herein by reference in its entirety, describes a SOFC design with porous electrodes and use of pore formers to form porous electrodes. In such SOFC, at least one of anode and cathode electrodes is initially deposited with a pore former which is then removed from the electrodes by heating or annealing to leave a porous electrode located over an electrolyte which has a lower porosity. Any suitable pore former material may be used, such as for example carbon (e.g., graphite, activated carbon, petroleum coke, carbon black or the like), starch (e.g., corn, barley, bean, potato, rice, tapioca, pea, sago palm, wheat, canna, or the like), and/or polymer (e.g., polybutylene, polymethylpentene, polyethylene (such as beads), polypropylene (such as beads), polystyrene, polyamides (nylons), epoxies, ABS, acrylics, polyesters (PET), or the like), as described in U.S. Published Application 2007/0006561, which is incorporated herein by reference.

If desired, different pore formers may be incorporated into different layers (which can also be referred to as sublayers) of the same electrode to obtain an electrode comprised of different porosity layers. For example, a first type of pore former material may be incorporated into a first electrode layer and a second pore former material different in at least one of size, concentration or composition from the first pore former material is incorporated into a second electrode layer. For example, the second pore former material may comprise particles having a larger or smaller size or diameter than the first pore former material depending if it is desired to form larger or smaller pores in the second layer compared to the first layer. Alternatively, the second pore former material may comprise a material composition which is easier or harder to remove from the electrode by heating than the first pore former material if it is desired to form more or less pores in the in the second layer compared to the first layer. Finally, the second pore former material concentration may be higher or lower than that of the first pore former material if it is desired to form more or less pores in the second layer compared to the first layer. Thus, the first electrode layer may be designed to have a different porosity (i.e., pore size and/or number of pores) from the second electrode layer by using different sputtering targets with different pore formers to deposit each layer. For example, U.S. application Ser. No. 11/907,204 filed on Oct. 10, 2007 and incorporated herein by reference in its entirety describes a SOFC having an anode electrode having a first layer adjacent to the electrolyte with a lower porosity than a second layer which is located over the first layer. Such electrode may be formed using the pore former method described herein. Furthermore, the cathode electrode comprising layers with different porosity may also be formed using the pore former method described herein.

Furthermore, as discussed above, sputtering allows depositing plural electrode layers to functionally grade the electrode composition, such that for example each layer has a different composition or crystallinity. For example, a cathode electrode may comprise a doped ceria layer located below a LSM or other perovskite layer or it may comprise two different LSM layers with different compositions or crystallinity. An anode electrode may have a different nickel to ceramic ratio in the cermet in each layer, as described in U.S. application Ser. No. 11/907,204 filed on Oct. 10, 2007 and incorporated herein by reference in its entirety by using different sputtering targets to deposit each layer of the electrode. Alternatively, an anode electrode may comprise a doped ceria layer below a nickel-stabilized zirconia or a nickel-stabilized zirconia-doped ceria cermet layer as described in U.S. application Ser. No. 11/785,034 filed on Apr. 13, 2007 and incorporated herein by reference in its entirety by using different sputtering targets to deposit each layer.

While sputtering was described as a preferred deposition method, other methods may also be used. For example, the LSM barrier layer on the interconnect may be deposited by a powder deposition method. One example is magnetic powder deposition which uses a magnet (i.e., a magnetic field) to form a uniform layer of LSM powder on the interconnect followed by melting the powder layer to obtain a very thin and uniform film. Any suitable heating source, such as resistance heaters, high temperature filament bulbs, laser, etc., may be used for melting the powder.

Chemical vapor deposition (CVD) may be used to deposit electrodes, such as LSM cathode electrodes, in an alternative embodiment. CVD may used to induce controlled, uniform porosity in a uniform electrode film. Post deposition treatment with high temperature annealing (thermal or optical heating, such as UV curing, etc.) may follow the deposition.

Fuel cell stacks are frequently built from a multiplicity of SOFC's in the form of planar elements, tubes, or other geometries. Fuel and air has to be provided to the electrochemically active surface, which can be large. As shown in FIG. 1, one component of a fuel cell stack is the so called gas flow separator (referred to as a gas flow separator plate in a planar stack) or interconnect 9 that separates the individual cells in the stack. The gas flow separator plate separates fuel flowing to the fuel electrode (i.e. anode 3, such as a nickel-stabilized zirconia and/or doped ceria cermet) of one cell in the stack from oxidant, such as air, flowing to the air electrode (i.e. cathode 7, such as an LSM cathode described above) of an adjacent cell in the stack. The fuel may be a hydrocarbon fuel, such as natural gas for internally reforming cells, or a reformed hydrocarbon fuel comprising hydrogen, water vapor, carbon monoxide and unreformed hydrocarbon fuel for externally reforming cells. The separator 9 contains gas flow passages or channels 8 between the ribs 10. Frequently, the gas flow separator plate 9 is also used as an interconnect which electrically connects the fuel electrode 3 of one cell to the air electrode 7 of the adjacent cell. In this case, the gas flow separator plate which functions as an interconnect is made of or contains electrically conductive material, such as a Cr—Fe alloy. An electrically conductive contact layer, such as a nickel contact layer or mesh, may be provided between the anode electrode and the interconnect. A conductive ceramic layer, such as the LSM barrier layer discussed above, may be provided between the cathode electrode and the next adjacent interconnect of the stack. FIG. 1 shows that the lower SOFC 1 is located between two gas separator plates 9.

The electrolyte 5 of the SOFC is a ceramic electrolyte, such as a stabilized zirconia and/or doped ceria, such as yttria stabilized zirconia ("YSZ"), scandia stabilized zirconia ("SCZ"), gadolinia doped ceria ("GDC") and/or samaria doped ceria ("SDC") electrolyte. If desired, an optional interlayer layer is located between the electrolyte 3 and anode 5, and another interlayer is located between the electrolyte 5 and cathode 7. If desired, only one of the layers may be used in the SOFC. Materials such as doped ceria, which can enhance redox stability of the cell and further reduce the usage of expensive materials, may be used to fabricate the interlayers. Samaria, gadolinia or yttria doped ceria (in other words, the ceria may contain Sm, Gd and/or Y dopant element which forms an oxide upon incorporation into the ceria) may be used as the interlayer material. Preferably, the doped ceria phase composition comprises $Ce_{(1-x)}A_xO_2$, where A comprises at least one of Sm, Gd, or Y, and x is greater than 0.1 but less than 0.4. For example, x may range from 0.15 to 0.3 and may be equal to 0.2. The interlayer(s) may also be formed by sputtering.

Furthermore, while FIG. 1 shows that the stack comprises a plurality of planar or plate shaped fuel cells, the fuel cells may have other configurations, such as tubular. Still further, while vertically oriented stacks are shown in FIG. 1, the fuel cells may be stacked horizontally or in any other suitable direction between vertical and horizontal.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity. In this case, the electrical power output from both stacks cannot be separately controlled.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of making a solid oxide fuel cell (SOFC), comprising:
   providing a solid oxide electrolyte having a first major surface and a second major surface opposite the first major surface and a thickness that is at least 50 microns and less than 150 microns;
   depositing an anode electrode over the first major surface of the electrolyte;
   depositing a cathode electrode over the second major surface of the electrolyte to form an electrolyte-supported SOFC, wherein at least one of the anode electrode and the cathode electrode has a total thickness of less than 10 microns and the entire electrode of the at least one of the anode electrode and the cathode electrode is deposited on the electrolyte by physical vapor deposition to produce a solid oxide fuel cell having a planar outer surface defined by the at least one of the anode electrode and the cathode electrode that is deposited on the electrolyte by physical vapor deposition; and
   incorporating the solid oxide fuel cell into a fuel cell stack wherein portions of the planar outer surface defined by the at least one of the anode electrode and the cathode electrode that is deposited on the electrolyte by physical vapor deposition are in contact with ribs of an adjacent interconnect in the stack and are exposed to gas flow channels defined between the planar outer surface and the ribs of the adjacent interconnect in the stack.

2. The method of claim 1, wherein the step of depositing the cathode electrode comprises depositing a perovskite cathode electrode by sputtering.

3. The method of claim 2, wherein the perovskite cathode electrode comprises LSM.

4. The method of claim 3, wherein the cathode electrode is formed by static or dynamic reactive sputtering or static or dynamic passive sputtering.

5. The method of claim 3, wherein the cathode electrode has a thickness less than 10 microns.

6. The method of claim 1, wherein the step of depositing the anode electrode comprises depositing a cermet anode electrode by sputtering.

7. The method of claim 6, wherein the cermet anode comprises a nickel component comprising nickel or nickel oxide and a ceramic component comprising at least one of scandia stabilized zirconia, yttria stabilized zirconia, samaria doped ceria or gadolinia doped ceria.

8. The method of claim 1, wherein the step of depositing at least one of the anode electrode and the cathode electrode comprises depositing plural electrode layers under different deposition conditions.

9. The method of claim 8, wherein the step of depositing at least one of the anode electrode and the cathode electrode comprises depositing plural electrode layers to functionally grade the electrode composition.

10. The method of claim 1, further comprising in-situ crystallizing at least one of the anode electrode and the cathode electrode.

11. The method of claim 2, further comprising incorporating a pore former material into the anode electrode during the step of sputtering and heating the anode electrode to remove the pore former material from the electrode to form a porous electrode.

12. The method of claim 11, wherein incorporating the pore former material into the anode electrode comprises incorporating a first pore former material into a first electrode layer and incorporating a second pore former material different in at least one of size, concentration or composition from the first pore former material into a second electrode layer, such that the first electrode layer comprises a different porosity from the second electrode layer.

13. The method of claim 1, further comprising:
positioning the solid oxide electrolyte between first and second physical vapor deposition sources, wherein the anode electrode is deposited using the first physical vapor deposition source at the same time the cathode electrode is deposited using the second physical vapor deposition source.

14. The method of claim 13, wherein the first physical vapor deposition source comprises at least one anode material sputtering target and the second physical vapor deposition source comprises at least one cathode material sputtering target.

* * * * *